(12) United States Patent
Russell et al.

(10) Patent No.: US 12,535,211 B2
(45) Date of Patent: Jan. 27, 2026

(54) ELECTRIC ARC LIGHTER

(71) Applicant: ECO LYTER INC., Winnipeg (CA)

(72) Inventors: Kelly Russell, Winnipeg (CA); Melissa Tellier, Winnipeg (CA)

(73) Assignee: Eco Lyter Inc., Winnipeg (CA)

( * ) Notice: Subject to any disclaimer, the term of this patent is extended or adjusted under 35 U.S.C. 154(b) by 303 days.

(21) Appl. No.: 18/185,583

(22) Filed: Mar. 17, 2023

(65) Prior Publication Data

US 2023/0296249 A1 Sep. 21, 2023

Related U.S. Application Data

(60) Provisional application No. 63/320,871, filed on Mar. 17, 2022.

(51) Int. Cl.
*F23Q 3/01* (2006.01)
*F23Q 3/00* (2006.01)

(52) U.S. Cl.
CPC ............... *F23Q 3/01* (2013.01); *F23Q 3/006* (2013.01)

(58) Field of Classification Search
CPC ............... F23Q 3/006; F23Q 3/01; F23Q 2/18
See application file for complete search history.

(56) References Cited

U.S. PATENT DOCUMENTS

| | | | |
|---|---|---|---|
| 1,549,644 A | 8/1925 | Williams | |
| 2,753,705 A | 7/1956 | Quartier | |
| 3,811,819 A | 5/1974 | Toiseux | |
| D779,115 S * | 2/2017 | Stoll | D27/153 |
| 2012/0315588 A1 | 12/2012 | Kondrat | |
| 2014/0076879 A1 | 3/2014 | Ye et al. | |
| 2016/0040877 A1 * | 2/2016 | Mohamedali | F23Q 3/01 431/258 |
| 2022/0074593 A1 * | 3/2022 | Nichols | F23D 3/18 |
| 2022/0235935 A1 * | 7/2022 | Wu | F23Q 3/006 |
| 2023/0157355 A1 * | 5/2023 | Dotson | F23Q 3/01 431/253 |

FOREIGN PATENT DOCUMENTS

| | | |
|---|---|---|
| CN | 108954378 | 12/2018 |
| GB | 553006 | 5/1943 |

* cited by examiner

*Primary Examiner* — Alfred Basichas
(74) *Attorney, Agent, or Firm* — Adrian D. Battison; Ade & Company Inc.; Ryan W. Dupuis

(57) ABSTRACT

An electric arc lighter having a handheld body with a pair of spaced-apart electrodes supported on an exterior of the body. The electrodes carrying electrical current through a gas between the physically separated electrodes and forming an electrical arc. A voltage source in the body and electrically connected to the electrodes to form a voltage therebetween form the electrical arc. The electric arc lighter features a receptacle receiving a supply of combustible material. A passageway through the body of the lighter receives the combustible material from the supply and guides the combustible material for delivery to the electrodes and into a path of the electrical arc. A feeding mechanism feeds the combustible material from the supply and through the passageway for ignition by the electrical arc to form a flame.

15 Claims, 5 Drawing Sheets

ELECTRIC ARC LIGHTER

This application claims the benefit under 35 U.S.C. 119(e) of U.S. Provisional Application Ser. No. 63/320,871 filed Mar. 17, 2022.

FIELD

The present invention relates generally to an electric lighter, and more particularly to an electric arc lighter with an interior receptacle arranged to receive a supply of combustible material to be ignited to form a flame.

BACKGROUND

Conventional lighters generally have a fuel supply (e.g. lighter fluid), such as butane, that is ignited using a flint in order to ignite a combustible article, such as a cigarette. Although some lighters allow for replacement of the fuel supply, which is typically a liquid, the process may be messy as the liquid may spill while refueling a reservoir within the lighter. In addition, the fuel may evaporate quickly as lighters with refillable reservoirs are typically not sealed. Disposable lighters have attempted to address these issues by providing a factory-sealed reservoir. Once the reservoir is emptied of fuel, the lighter is discarded as waste. The flint for both refillable and disposable lighters may also be prone to wearing out requiring replacement. Again, the worn out flint is discarded as waste.

In an ever-increasing environmentally conscious society, conventional flame-generating lighters produce physical waste as well as greenhouse gases from combustion of the fuel as well as evaporation of fuel.

SUMMARY

According to an aspect of the invention, there is provided an electric arc lighter comprising: a body configured to be supported in a hand of a user; one or more pairs of spaced-apart electrodes supported on an exterior of the body, wherein the one or more pairs of the electrodes are configured to carry electrical current through a gas between respective ones of the one or more pairs of the electrodes in the form of one or more electrical arcs; a voltage source carried in the body and operatively electrically connected to the one or more pairs of the electrodes, wherein the voltage source is configured to form voltage between respective ones of the one or more pairs of the electrodes to ionize the gas to form the one or more electrical arcs; a receptacle inside the body and configured to receive a supply of combustible material; a passageway through the body and configured to receive the combustible material from the supply and to guide the combustible material for delivery to the exterior of the body, wherein the passageway has an inlet in operative communication with the receptacle to receive the combustible material from the supply and an outlet at a periphery of the body and configured to dispense the combustible material from the body, wherein the outlet is arranged in proximity to the one or more pairs of the electrodes to dispense the combustible material into a path of at least one of the one or more electrical arcs; and a feeding mechanism operatively supported in the body and configured to feed the combustible material from the supply and through the passageway to the exterior of the body for ignition by said at least one of the one or more electrical arcs to form a flame.

This provides a lighter with dual operation, that is either to use the electrical arc or a flame supported by the dispensable combustible material contained in the body as an ignition source.

In some arrangements, the outlet of the passageway is positioned intermediate respective electrodes of said at least one of the one or more pairs of the electrodes that form said at least one of the one or more electrical arcs to ignite the combustible material.

In the illustrated arrangement, the one or more pairs of the electrodes comprises multiple pairs of the electrodes arranged to form intersecting electrical arcs, and preferably, the outlet is positioned centrally of the respective electrodes of the multiple pairs thereof.

In the illustrated arrangement, the feeding mechanism comprises counter-rotating meshing gears on either side of the passageway and arranged to draw the combustible material therebetween.

In the illustrated arrangement, the feeding mechanism is actuated by a rotary member exposed at the periphery of the body.

In the illustrated arrangement, the feeding mechanism is disposed at an intermediate location along the passageway between the inlet and the outlet.

In the illustrated arrangement, the feeding mechanism is disposed closer to the outlet of the passageway than to the inlet.

In the illustrated arrangement, the body extends longitudinally between top and bottom ends and has a longitudinally-oriented axis, the receptacle and the one or more pairs of the electrodes are in longitudinally spaced non-adjacent relation to one another, and the passageway comprises a plurality of turns in opposite directions relative to the axis to guide the combustible material around elements of the electric arc lighter between the receptacle and the electrodes.

In the illustrated arrangement, the outlet of the passageway is disposed generally centrally in a lateral direction of the body between opposite sides thereof; and the passageway comprises an upstream portion extending substantially longitudinally of the body and closer to one of the sides than to an opposite one thereof, and a transverse portion between the upstream portion and the outlet and extending longitudinally and laterally towards the opposite side.

In the illustrated arrangement, the passageway further comprises an end portion in direct communication with the outlet and disposed downstream of the inclined portion, wherein the end portion extends linearly.

In the illustrated arrangement, the feeding mechanism is disposed along the inclined portion of the passageway.

According to another aspect, there is provided a handheld electric arc lighter comprising: a body; at least two spaced-apart electrodes supported on an exterior of the body, wherein the at least two electrodes provide a voltage therebetween to generate at least one electrical arc; a voltage source within the body and operatively electrically connected to the at least two electrodes and providing the voltage thereto; a receptacle inside the body for receiving a supply of combustible material; a passageway guiding the combustible material from the receptacle through the body to an outlet at a periphery of the body, the outlet dispensing the combustible material in proximity to the at least two electrodes and into a path of the at least one electrical arc; and a feeding mechanism within the body for feeding the combustible material from the supply and through the passageway to the outlet for ignition by the at least one electrical arc to form a flame. The outlet of the passageway may be positioned intermediate respective of the at least two electrodes. The at least two electrodes may have multiple pairs of the electrodes arranged to form at least one intersecting electrical arc. The outlet may be positioned at the at least one intersecting electrical arc.

The feeding mechanism may have a set of counter-rotating meshing gears on either side of the passageway and arranged to draw the combustible material therebetween. The feeding mechanism may be actuated by a rotary member exposed at a periphery of the body. The feeding mechanism may be disposed at an intermediate location along the passageway between the receptacle and the outlet. The feeding mechanism may be disposed closer to the outlet of the passageway than to the receptacle.

The body may extend longitudinally between a top end and a bottom end and may have a longitudinally-oriented axis. The receptacle and the at least two electrodes may be longitudinally spaced non-adjacent relation to one another. The passageway may have a plurality of turns in opposite directions relative to the longitudinally-oriented axis to guide the combustible material between the receptacle and the electrodes. The outlet of the passageway may be disposed generally centrally in a lateral direction of the body between opposite sides thereof. The passageway may have an upstream portion extending substantially longitudinally of the body and closer to one of the sides than to an opposite one thereof, and a transverse portion between the upstream portion and the outlet and extending longitudinally and laterally towards the opposite side. The passageway may have an end portion in direct communication with the outlet and disposed downstream of an inclined portion, wherein the end portion extends linearly. The feeding mechanism may be disposed along the inclined portion of the passageway. The electrical power source may comprise a battery and a transformer for providing the voltage to the at least two electrodes.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

In the drawings like characters of reference indicate corresponding parts in the different figures.

DETAILED DESCRIPTION

Figure 1:
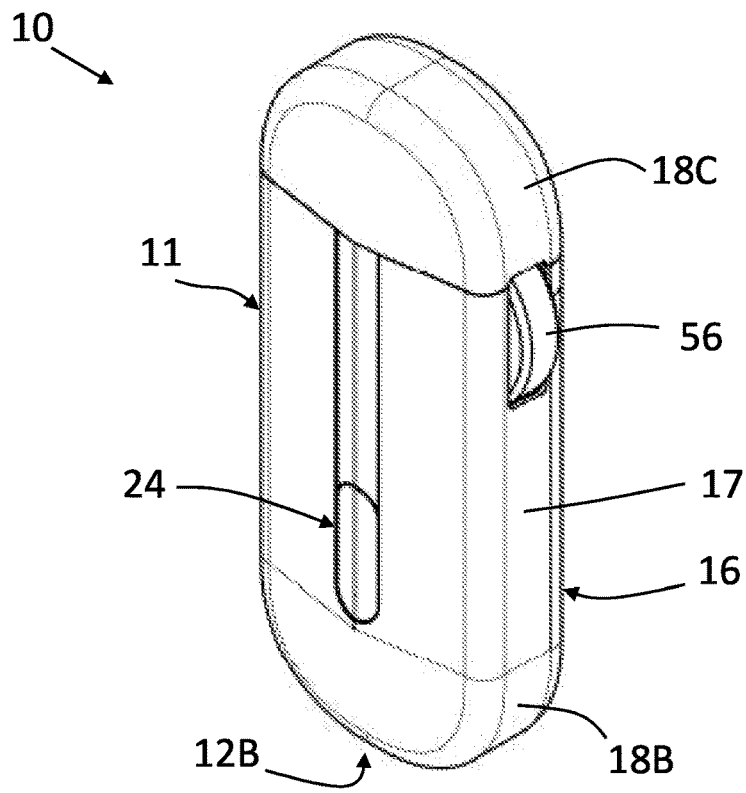
FIG. 1 is a front perspective view of an arrangement of an electric arc lighter.
Figure 2:
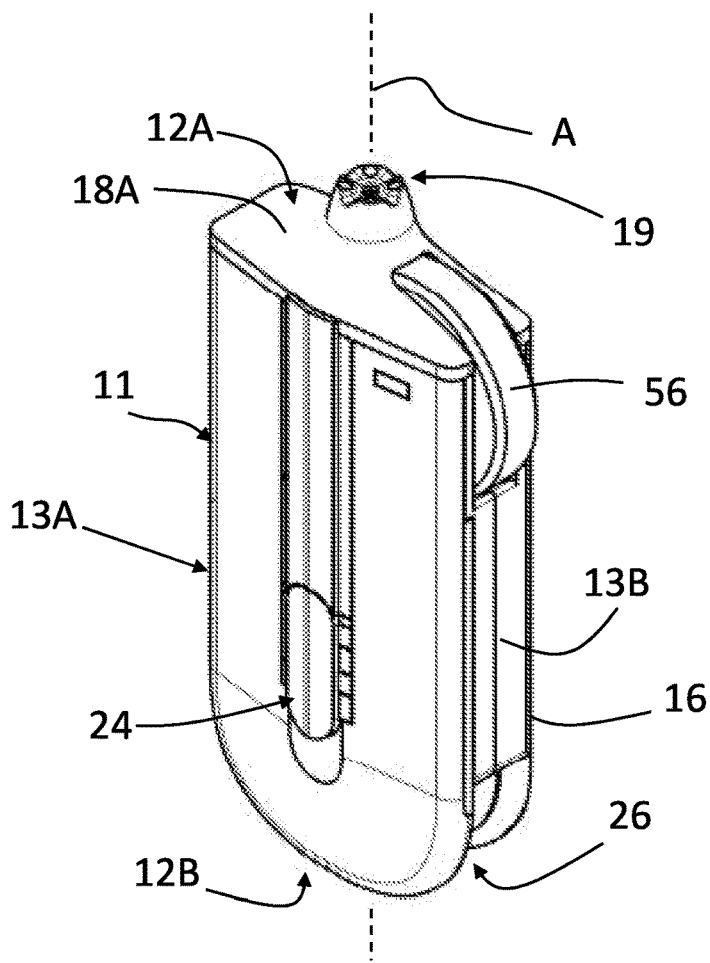
FIG. 2 is another front perspective view of the arrangement of FIG. 1 with a lid and bottom cover omitted to illustrate otherwise hidden components.

Illustrative embodiments are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Referring to the accompanying figures, there is shown an electric arc lighter 10 which is configured to generate a flame as a secondary ignition source for combusting a flammable article such as a cigarette.

An electric arc lighter 10 may comprise an electrical power source 21, usually in the form of a rechargeable battery, and an electrode pair 19 may be operatively electrically connected thereto to conduct electrical current. The electrodes 19 may be arranged in such a manner as to form an electrical arc through a gas surrounding the electrode pair 19, which generates heat usable to ignite a combustible article, such as a cigarette. Generally speaking, the electric arc lighter 10 may be usable for many more ignition events as compared to the flint of a conventional lighter. The power source 21 may be recharged rather than discarded like the flint in the conventional lighter.

The arc lighter 10 comprises a body 11 configured to be supported in a hand of a user, so as to be handheld, by being sized and shaped to fit in the user's hand. The body 11 extends longitudinally between top end 12A and bottom end 12B and extends laterally, that is cross-wise to the longitudinal direction, between opposite sides 13A, 13B of the body. The lighter body 11 may have a longitudinally-oriented laterally-centered axis A, as the lighter body 11 may be substantially linear in shape in the longitudinal direction. In the illustrated arrangement, the body 11 comprises a frame or chassis 15 to which internal components of the lighter may be mounted, and which is accordingly configured to support same, and a housing or shell 16 supported by the frame 15 to envelop and enclose same and the internal components. The shell 16 may be formed from multiple components removably mounted on the frame 15 such as a linearly-extending tubular sleeve 17 and opposite removable top and bottom covers 18A, 18B. A lid 18C may be hingedly mounted to the body, for example at the sleeve 17, for covering components exterior to the body 11 and otherwise exposed to an external environment thereof.

To generate heat-radiating plasma, which is a primary ignition source of the arc lighter, the lighter 10 comprises at least two spaced-apart electrodes 19 supported on an exterior of the body 11, which is defined by the housing 16. In this aspect, two pairs of electrodes 19 may form the electrical arcs. The electrodes 19 may be configured to carry an electrical current through a gas therebetween in the form of an electrical arc (not shown). The lighter 10 may further comprise a voltage source 21 carried in the body 11 (so as to be internal thereto) and operatively connected to the pairs of electrodes 19. The voltage source 21 is configured to form voltage across respective ones of each pair of electrodes to ionize the gas to form the electrical arc therebetween. Thus, in the case of multiple pairs of electrodes, as in the illustrated arrangement, the arc lighter may form multiple electrical arcs.

The voltage source 21 may comprise an electrical transformer 23, such as a flyback transformer, operatively electrically connected to a battery which aids in achieving a prescribed voltage (e.g. 3-kV to 20-kV) to ionize the gas between, and more generally surrounding, the electrodes 19. The voltage source 21 may be operable by an external switch 24 at the exterior of the body 11 to selectively activate the source 21 for selectively generating the electrical arcs.

Since the electrodes 19 are exposed to an external environment of the lighter body 11 as the electrodes 19 are located on the exterior thereof, the gas between the electrodes 19 may be an ambient gas, typically air, which is generally considered not to be electrically conductive. However, upon formation of a sufficiently high prescribed voltage at the electrodes 19, the air in an intervening space between the physically separated and distanced electrodes 19 is ionized and an electrical current formed therethrough. The prescribed voltage may be determined at least in part on a distance between the electrodes 19.

Figure 3:
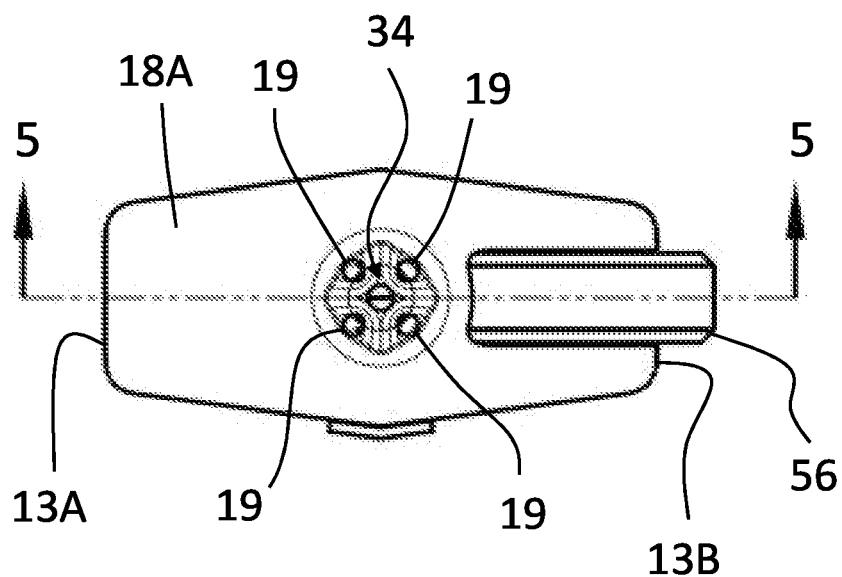
FIG. 3 is a top plan view of the arrangement of FIG. 1 as shown in FIG. 2.
Figure 4:
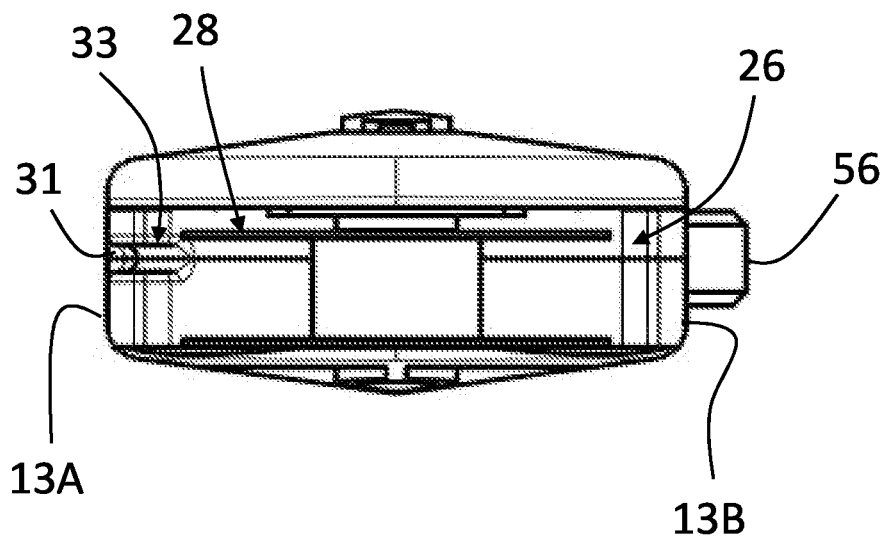
FIG. 4 is a bottom plan view of the arrangement of FIG. 1 as shown in FIG. 2.

In the illustrated arrangement, which has more than one pair of spaced-apart electrodes 19, there are specifically two pairs of electrodes arranged in a rectangular or square fashion as more clearly shown in FIG. 3. Furthermore, the electrodes 19 may be arranged such that diagonally opposite electrodes cooperate to form an arc, such that the resultant arcs upon electrical excitation of the electrodes intersect to form an X in top plan view.

The voltage source 21 may be rechargeable and may be operatively electrically connected to a charging port (not shown) in the form of a universal serial bus (USB) connector disposed at the exterior of the body 11 so as to be configured for recharging by electrical connection to an external power source (not shown), that is external to the lighter.

As the distance between the electrodes 19 may be limited and a length of time the transformer 23 may be active may also be limited in order to prevent damage to the electrodes 19, a secondary ignition source may be provided as described herein that may be ignited by the arc. The arc lighter 10 may include a receptacle 26 inside the body 11 and configured to receive a supply 28 of combustible material. In addition, there is provided a passageway 31 through the body, which is configured to receive the combustible material from the supply 28 and to guide the combustible material for delivery to the exterior of the body 11.

Figure 5:
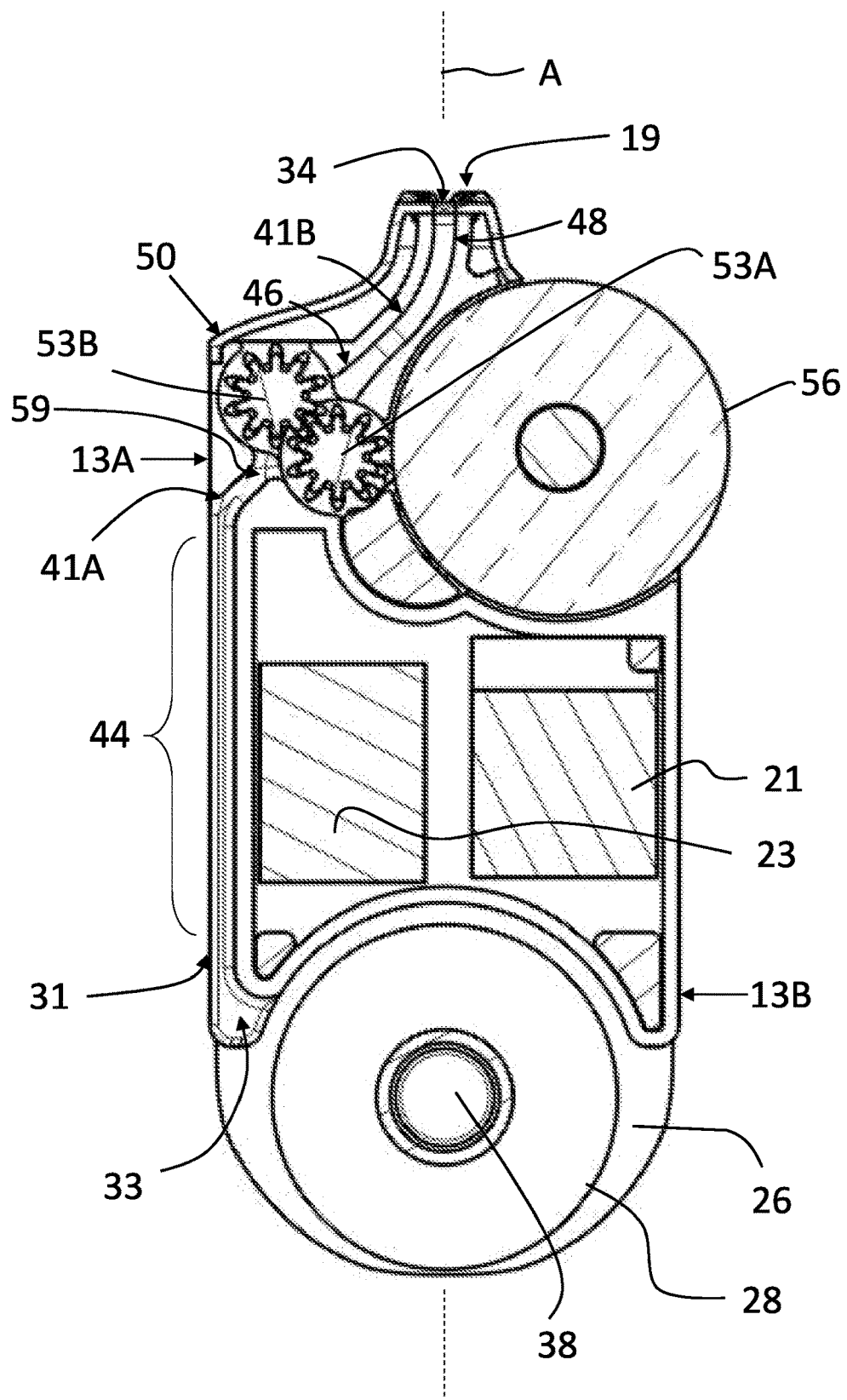
FIG. 5 is a cross-sectional view along line 5-5 in FIG. 3.
Figure 6:
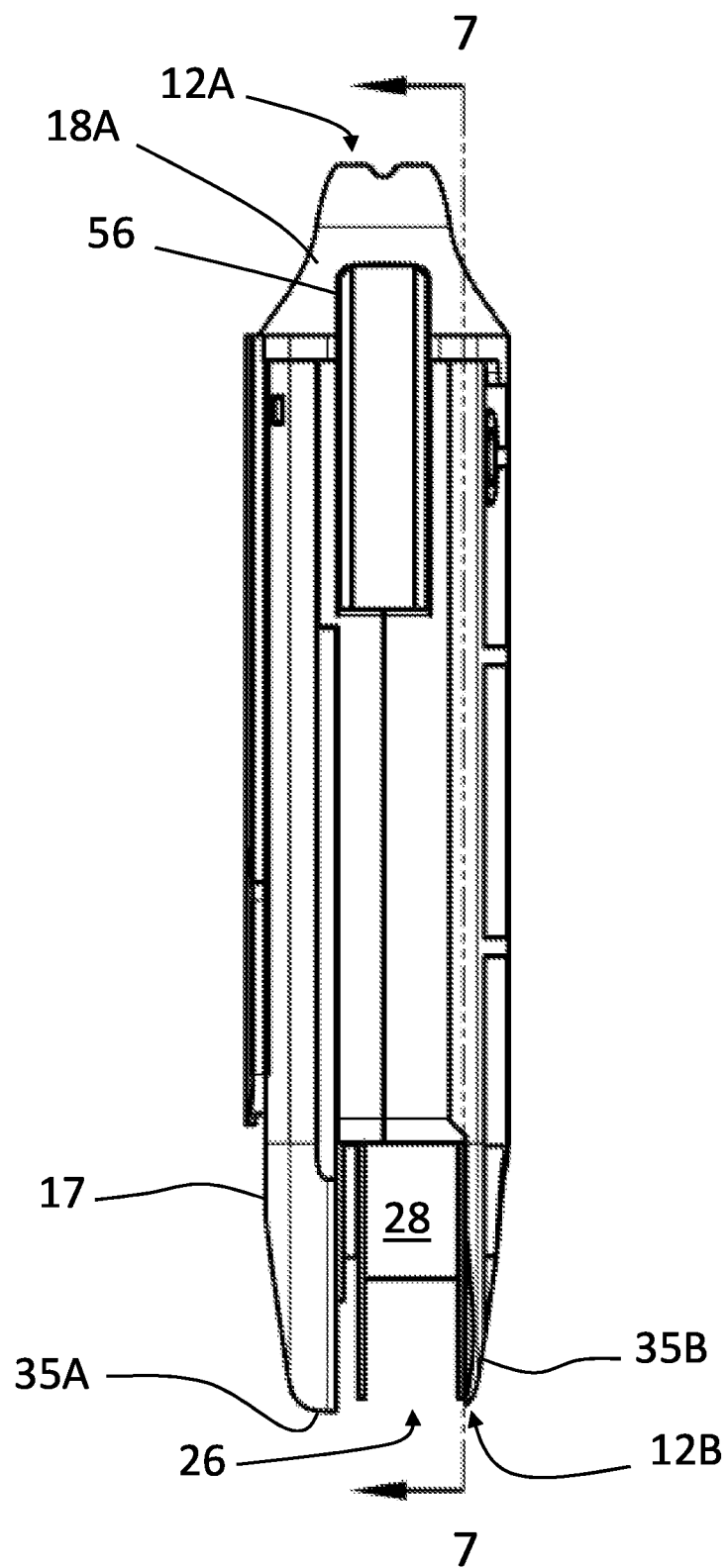
FIG. 6 is a side view of the arrangement of FIG. 1 as shown in FIG. 2.
Figure 7:
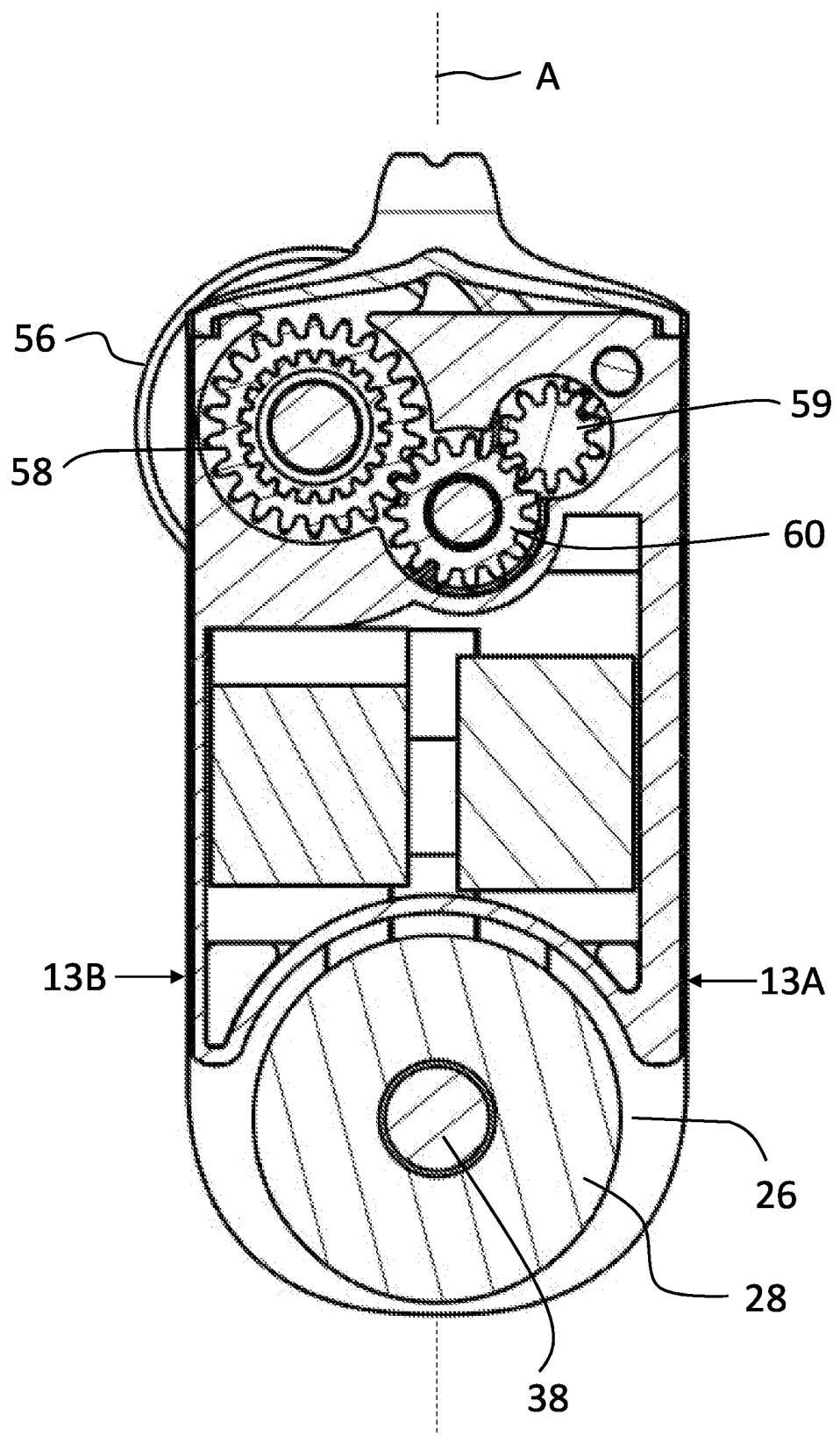
FIG. 7 is a cross-sectional view along line 7-7 in FIG. 6.

The passageway 31 may have an inlet 33 in operative communication with the receptacle 26 to receive the combustible material from the supply 28 and an outlet 34 at a periphery of the body defining the exterior thereof and configured to dispense the combustible material from the body 11. The outlet 34 may be located downstream of the inlet 33 relative to a direction of movement of the combustible material through the passageway 31, which is from the inlet 33 to the outlet 34. The outlet 34 may be arranged in proximity to the one or more pairs of the electrodes 19 to dispense the combustible material into a path of at least one electrical arc formable by the electrodes 19, which is more clearly shown by FIG. 5.

In the illustrated arrangement, the passageway outlet 34 is positioned intermediate respective ones of at least one pair of the electrodes 19, so that the outlet 34 is registered with the electrical arc formed thereby. Since the electrical arc formed between a cooperating pair of electrodes 19 with the prescribed voltage extends along a path between the individual electrodes 19 of the cooperating pair that has a linear projection onto the lighter body 11, the outlet 34 is arranged on the body's exterior along an imaginary line 36 interconnecting the electrodes of the cooperating pair. In this aspect, the outlet 34 is arranged centrally between the electrodes 19 so that the flame from the combustible material is disposed as far away as possible from either one of the electrodes of the pair.

As previously mentioned, the illustrated arrangement of lighter comprises multiple arc-forming electrode pairs 19, which are arranged to form intersecting electrical arcs. In such an arrangement, the passageway outlet 34 is positioned centrally of the respective electrodes 19 of the multiple pairs thereof so that all of the arcs contribute to igniting the dispensed combustible material.

The arc lighter 10 may be configured to store and dispense a solid combustible material such as a wick or cord made of hemp adapted for combustion, which is flexible and can be provided in a string-like length windingly stored on a spool 28. As the wick or cord may be constructed of a natural fiber, the emissions from the lighter 10 do not contribute to GHG emissions. Thus, in the illustrated arrangement of lighter 10, the receptacle 26 is in the form of a hollow cavity in the body 11 which is selectively communicated with an external environment of the lighter 10 by the removable cover 18B. The receptacle 26 may be sized and shaped to receive the spool 28 storing the combustible material. In the illustrated arrangement, the receptacle 26 is defined by opposite front and rear spaced-apart walls 35A, 35B defined by the sleeve 17 which leave a gap around bottoms and sides thereof that is closed by cover 18B.

To support delivery of the combustible material, the receptacle 26 is configured to rotatably support the spool 28 by way of a stub shaft 38 protruding from an interior side of one of the two opposite walls forming the receptacle and terminating in detached relation at or adjacent an interior side of the opposite wall. The supply 28 of combustible material is replaceable once fully consumed.

To guide the solid string-like combustible material from the receptacle 26 to a location in proximity to the electrodes 19, the passageway 31 may be in the form of a tubular duct and the inlet 33 defines an opening in communication with the receptacle 26, which may be sized and shaped based on a cross-section of the combustible material to be passed therethrough. Similarly, the outlet 34 may define an opening in communication with the external environment of the lighter body 11, through which the string-like combustible material can extend out of the body 11 to an externally located exposed length suited to intervene the path of an electrical arc for ignition. The tubular passageway duct is wholly internal to the lighter 10, that is a full length of the passageway 31 from the inlet 33 to the outlet 34 is inside the body 11, and the passageway 31 is formed by the body 11. In the illustrated arrangement, the passageway 31 is collectively formed by the frame 15 of the body and the removable sleeve 17, that is a wall of select length-wise sections of the passageway 31 are defined in part by the sleeve 17 and in part, the other remaining part, by the frame 15. Thus, by disassembling the body 11 to separate the sleeve 17 from the frame 15, select sections of the passageway may be made accessible at locations spaced from the inlet 33 and the outlet 34.

It will be appreciated that the lighter body 11 locates the receptacle 26 at the bottom end 12B and the electrodes 19 at the top end 12A such that the receptacle 26 and electrode pairs are in longitudinally spaced relation to one another. Furthermore, the receptacle 26 and the electrode pairs 19 are non-adjacent as there are elements of the electric arc lighter 10 between the receptacle 26 and the electrodes 19, in this case, most notably, the voltage source 21 and transformer 23.

Furthermore, the passageway outlet 34 is disposed generally centrally in a lateral direction of the body 11. The supply receptacle 26 is also disposed generally centrally in a lateral direction of the body 11, such that the passageway outlet 34 and the supply receptacle 26 are collinear and, more specifically, coaxial with axis A.

To guide the combustible material around the intervening elements of the arc lighter 10, the passageway 31 comprises a plurality of turns, in this case two indicated at 41A and 41B, in opposite directions relative to the axis A. The turn 41A may form an inclined portion towards the outlet 34. In this manner, the passageway 31 is configured to guide the combustible material from the centrally-disposed receptacle 26 at the bottom of the body 11 to the centrally-disposed or positioned electrodes 19 at the top, opposite to the receptacle 26.

More specifically, the passageway 31 comprises an upstream portion 44 extending substantially longitudinally of the body 12 and closer to one of the sides, in this case 13A, than to an opposite one thereof 13B, and a transverse portion 46 between the upstream portion 44 and the outlet 34 and extending longitudinally and laterally towards the opposite side, in this case 13B. In the illustrated arrangement, the upstream portion 44 defines the inlet opening of the passageway so as to be in direct communication with the inlet 33. The turn 41A interconnects the upstream portion 44 and the transverse portion 46.

Furthermore, the passageway 31 includes an end portion 48 in direct communication with the outlet 34 and disposed downstream of the inclined portion, relative to the direction of movement of combustible material through the passageway 31. The end portion 48 extends linearly and more specifically coaxially of the body so that a dispensed end portion of the combustible material, which is external of the body 11, is arranged to intersect the electrical arc at its apex in substantially perpendicular condition thereto. Turn 41B, which is considered to be directed generally away from the axis, interconnects the transverse portion 46 with the end portion 48 which is substantially parallel to the longitudinal direction of the body. In the illustrated arrangement, the end portion 48 is relatively short and has the shortest length of all of the aforementioned portions of the passageway 31.

To move the combustible material through the passageway 31, the lighter 10 comprises a feeding mechanism 50 operatively supported in the body 11 and configured to feed the combustible material from the supply 28, received in the receptacle 26, and through the passageway 31 to the exterior or out of the body 11 for ignition by the one or more electrical arcs to form a flame.

In the illustrated arrangement, the feeding mechanism 50 comprises material-engaging members 53A and 53B to move the combustible material through the passageway 31 in the form of counter-rotating meshing gears disposed on either side of the passageway 31 and arranged to draw the combustible material therebetween. The gears 53A, 53B are rotatably mounted to the frame 15 to rotate about respective rotational axes oriented normal to both the longitudinal and lateral directions of the body 11. The gears 53A, 53B are spaced apart so that the wick upon passage between the gears 53A, 53B is not crushed or cut by teeth of the gears, rather it is pulled therethrough upon counter-rotation of the gears 53A, 53B.

The gears 53A, 53B of the feeding mechanism 50 are registered with or disposed at the transverse portion 46 of the passageway 31, such that the feeding mechanism 50 is disposed at an intermediate location between the inlet 33 and outlet 34, and more specifically closer to the outlet 34 than to the inlet 33. To enable the gears 53A, 53B to engage the string-like combustible material received in the passageway 31, the wall of passageway 31 is interrupted to form a first section of the passageway 31, formed by the body 11, and located upstream of the feeding mechanism 50 and a second section, also formed by the body 11, and located downstream of the feeding mechanism 50 that is continuous. An intermediate section of the passageway 31, which interconnects the first turn 41A and the second turn 41B, is formed by a throat of the feeding mechanism 50 defined between the material-engaging members 53A, 53B thereof and also in part by the frame 15.

The feeding mechanism 50, which has cooperative rotary components 53A, 53B to pull the combustible strand through the passageway 31, is actuated by a rotary member 56 in the form of a wheel exposed at the periphery of the body 11. The rotary wheel 56 is operatively connected to the feeder gears 53A, 53B by a transmission in the form of a series of gears 58 through 60 respectively mounted for rotation in fixed relation to the feeder gears 53A, 53B and the wheel 56. The transmission gears 58, 59 and 60 are disposed in a distinct common plane for meshing. A first one of the transmission gears 58 is mounted in fixed relation to the rotary wheel 56; a second one of the transmission gears 59 is mounted in fixed relation to one of the feeder gears 53A, 53B, specifically a proximal one thereof 53A closest to the rotary wheel 56, and a distal one of the feeder gears 53B is driven for rotation by meshing with the proximal feeder gear 53A; and an interconnecting gear 60 is operatively connected to both the first, primary gear 58 and the feeder transmission gear 59 so that the two gears 58 and 59 are operatively interconnected thereby. The primary and feeder transmission gears 58 and 59 are not meshed or directly connected with one another.

As such, the feeding mechanism 50 and the voltage source 21 are independently operated such that the two ignition sources are independently usable. In some aspects, the voltage source 21 may supply power to an electric motor (not shown) for rotating the feeder gears 53A, 53B via the transmission gears 58, 59, 60 or otherwise. The external switch 24 may operate both the electric motor and/or the electrodes 19.

In use, the lighter 12 can be operated as a conventional arc lighter with or without a supply of combustible material loaded therein.

When it is desired to have dual operation or to use the secondary flame, a supply 28 of combustible material, usually sold separately to the lighter 10 as a replaceable component, may be loaded into the lighter body 11. This process may be achieved by placing the supply 28 in the receptacle 26 and operatively interconnecting the supply 28 with the passageway inlet 33. When the supply of combustible material is a spool of wick 28, or in other words combustible wick windingly stored on a spool, a free end of the wick is manually inserted into the passageway 31 and manually arranged at the throat of the feeding mechanism 50. The free end of the wick can be manually pushed through the passageway 31 until the end of the wick reaches the throat of the feeding mechanism 50, or if the removable sleeve 17 of the housing 16 is removed, an end portion of the wick dispensed from the spool 28 can be wrapped around a frame 15 portion of the passageway 31, that is the portion of the passageway 31 formed by the frame 15, to manually locate the free wick end at the throat. The free end of the wick is drawn between the feeder gears 53A, 53B by actuating the rotary wheel 56 to cooperatively counter-rotate the gears 53A, 53B to draw the wick therebetween and eventually into a downstream portion of the passageway 31, towards the outlet 34.

With the supply of combustible material loaded in the lighter 10, the voltage source 21 is activated using the switch 24 to form electrical arcs between the electrodes 19. While the arcs are formed, the combustible material may be dispensed from the outlet 34 and into the paths of the arcs, so that the arcs heat the combustible material until ignition thereof. The arcs can then be extinguished by deactivating, or turning off, the voltage source 21.

This provides a lighter 10 with dual operation, that is either to use the electrical arc or a flame supported by the dispensable combustible material contained in the body 11 as a secondary ignition source. The arc(s) or plasma are suited for igniting an article in windy conditions, and the feedable combustible material is suited for ignition by the arc to combust as an open flame for an extended period of time.

As described hereinbefore, the electric arc lighter 10 comprises a handheld body 11; a pair of spaced-apart electrodes 19 supported on an exterior of the body 11 and configured to carry electrical current through a gas between the physically separated electrodes in the form of an electrical arc; and a voltage source 21 in the body 11 and operatively electrically connected to the electrodes 19 to form a voltage therebetween to ionize the gas to form the electrical arc. The electric arc lighter 10 features a receptacle 26 configured to receive a supply 28 of combustible material. A passageway 31 through the body 11 of the lighter 10 is configured to receive the combustible material from the supply 28 and to guide the combustible material for delivery to the exterior of the body 11 in proximity to the electrodes 19 and into a path of the electrical arc. A feeding mechanism 50 operatively supported in the body 10 is configured to feed the combustible material from the supply and through the passageway 31 for ignition by the electrical arc to form a flame.

The scope of the claims should not be limited by the preferred embodiments set forth in the examples but should be given the broadest interpretation consistent with the specification as a whole.

The above detailed description of the embodiments is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A handheld electric arc lighter comprising:
a body;
at least two spaced apart electrodes supported on the body, wherein the at least two electrodes generate at least one electrical arc therebetween in response to a voltage applied thereacross;
an electrical power source within the body and operatively electrically connected to the at least two electrodes and providing the voltage thereacross;
a solid elongate flexible combustible material;
a receptacle inside the body containing a spooled coil of the solid elongate flexible combustible material;
a passageway guiding the solid elongate flexible combustible material from the spooled coil in the receptacle through the body to an end of the solid elongate flexible combustible material located at an outlet on the body;
the outlet being located between said at least two electrodes and within said at least one electrical arc between said at least two electrodes;
the outlet and said at least two electrodes being arranged such that said at least one electrical arc directly ignites combustion of the end of the solid elongate flexible combustible material; and
a feeding mechanism within the body including elements engaging sides of the solid elongate flexible combustible material at a position thereon spaced from the end thereof with the elements being movable so as to feed the solid elongate flexible combustible material from the spooled coil through the passageway to the outlet for direct ignition thereof by the at least one electrical arc to form a flame.

2. The handheld electric arc lighter according to claim 1, wherein the feeding mechanism is actuated by a manually operable rotary member exposed at a periphery of the body.

3. The handheld electric arc lighter according to claim 1, wherein the feeding mechanism is disposed at an intermediate location along the passageway between the spooled coil and the outlet.

4. The handheld electric arc lighter according to claim 1, wherein the body extends longitudinally between a top end and a bottom end and has a longitudinally-oriented axis, the receptacle and the at least two electrodes are in longitudinally spaced non-adjacent relation to one another, and the passageway comprises a plurality of turns in opposite directions relative to the longitudinally-oriented axis to guide the combustible material between the spooled coil in the receptacle and said at least two electrodes.

5. The handheld electric arc lighter according to claim 1, wherein the outlet of the passageway is disposed generally centrally in a lateral direction of the body between opposite sides thereof and the passageway comprises an upstream portion extending substantially longitudinally of the body and closer to one of the sides than to an opposite one thereof, and a transverse portion between the upstream portion and the outlet and extending longitudinally and laterally towards the opposite side.

6. The handheld electric arc lighter according to claim 5, wherein the passageway further comprises an end portion in direct communication with the outlet and disposed downstream of an inclined portion, wherein the end portion extends linearly.

7. The handheld electric arc lighter according to claim 6, wherein the feeding mechanism is disposed along the inclined portion of the passageway.

8. The handheld electric arc lighter according to claim 1, wherein the power source is a rechargeable battery and a flyback transformer.

9. A handheld electric arc lighter comprising:
a body;
at least two spaced apart electrodes supported on the body, wherein the at least two electrodes generate at least one electrical arc therebetween in response to a voltage applied thereacross;
an electrical power source within the body and operatively electrically connected to the at least two electrodes and providing the voltage thereacross;
a solid elongate flexible combustible material;
a receptacle inside the body containing a spooled coil of the solid elongate flexible combustible material;
a passageway guiding the solid elongate flexible combustible material from the spooled coil in the receptacle through the body to an end of the solid elongate flexible combustible material located at an outlet on the body;
the outlet being located between said at least two electrodes and within said at least one electrical arc between said at least two electrodes;
the outlet and said at least two electrodes being arranged such that said at least one electrical arc directly ignites combustion of the end of the solid elongate flexible combustible material; and
a feeding mechanism within the body engaging the solid elongate flexible combustible material at a position thereon spaced from the end thereof and feeding the solid elongate flexible combustible material from the spooled coil and through the passageway to the outlet for direct ignition thereof by the at least one electrical arc to form a flame;
wherein the feeding mechanism comprises a set of counter-rotating meshing gears each on a respective side of the passageway and arranged to draw the combustible material therebetween from the spooled coil.

10. The handheld electric arc lighter according to claim 9, wherein the feeding mechanism is actuated by a manually operable rotary member exposed at a periphery of the body.

11. The handheld electric arc lighter according to claim 9, wherein the feeding mechanism is disposed at an intermediate location along the passageway between the spooled coil and the outlet.

12. A handheld electric arc lighter comprising:
a body;
at least two pairs of spaced apart electrodes supported on the body, wherein the at least two pairs of spaced apart electrodes are arranged at apexes of a square and generate electrical arcs therebetween in response to a voltage applied thereacross;
an electrical power source within the body and operatively electrically connected to the at least two pairs of spaced apart electrodes and providing the voltage thereacross;
a solid elongate flexible combustible material;
a receptacle inside the body containing a spooled coil of the solid elongate flexible combustible material;
a passageway guiding the solid elongate flexible combustible material from the spooled coil in the receptacle through the body to an end of the solid elongate flexible combustible material located at an outlet on the body;
the outlet being located within the square so as to be between said at least two pairs of spaced apart electrodes and within said electrical arc between said at least two pairs of spaced apart electrodes;
the outlet and said at least two pairs of spaced apart electrodes being arranged such that said electrical arcs directly ignite combustion of the end of the solid elongate flexible combustible material; and
a feeding mechanism within the body including elements engaging sides of the solid elongate flexible combustible material at a position thereon spaced from the end thereof with the elements being movable so as to feed the solid elongate flexible combustible material from the spooled coil through the passageway to the outlet for direct ignition thereof by the electrical arcs to form a flame.

13. The handheld electric arc lighter according to claim 12, wherein the feeding mechanism is actuated by a manually operable rotary member exposed at a periphery of the body.

14. The handheld electric arc lighter according to claim 12, wherein the feeding mechanism is disposed at an intermediate location along the passageway between the spooled coil and the outlet.

15. The handheld electric arc lighter according to claim 12, wherein the feeding mechanism comprises a set of counter-rotating meshing gears each on a respective side of the passageway and arranged to draw the combustible material therebetween from the spooled coil.

* * * * *